Sept. 18, 1928.  E. G. GARTIN  1,684,668
LUBRICATING MECHANISM
Filed April 13, 1922
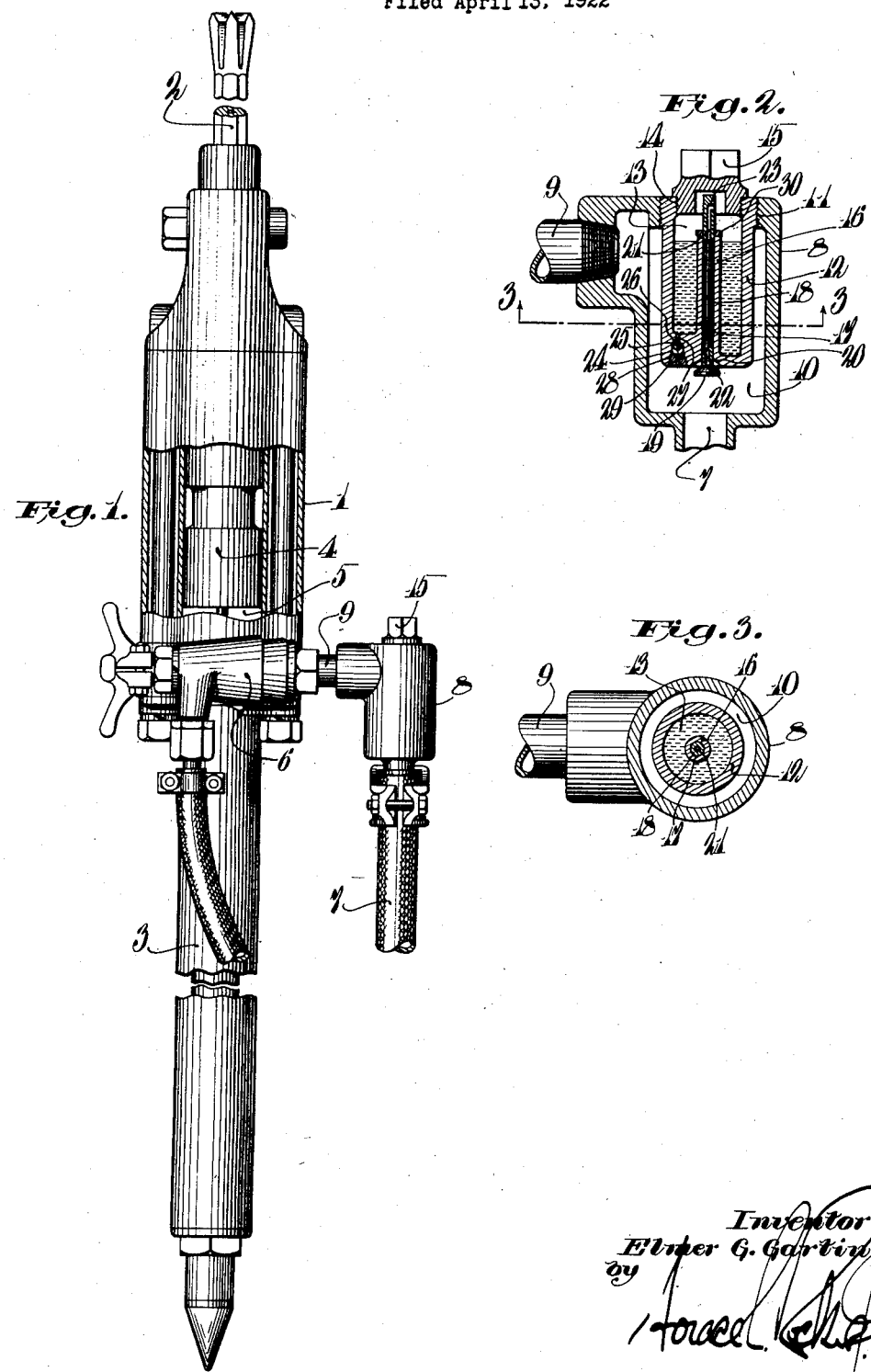
Inventor:
Elmer G. Gartin
by
Atty.

Patented Sept. 18, 1928.

1,684,668

UNITED STATES PATENT OFFICE.

ELMER G. GARTIN, OF CLAREMONT, NEW HAMPSHIRE, ASSIGNOR TO SULLIVAN MACHINERY COMPANY, A CORPORATION OF MASSACHUSETTS.

LUBRICATING MECHANISM.

Application filed April 13, 1922. Serial No. 552,274.

My invention relates to lubricating mechanisms, and more particularly to lubricating mechanisms for use in connection with fluid pressure operated motors and especially fluid pressure operated motors of the drilling type.

An object of my invention is to provide an improved lubricator. Another object of my invention is to provide an improved lubricator wherein the lubricant reservoir may be conveniently charged during the operation of the machine which is being supplied with lubricant and without the manual operation of any stop valve or the like. A further object of my invention is to provide an improved lubricating means for use in connection with rock drills in which the fluctuations in pressure occasioned by the operation of the drill cause the supply at the desired rate of the lubricant for the drill. Other objects and advantages of my invention will hereinafter more fully appear.

In the accompanying drawings I have shown for purposes of illustration one form which my invention may assume in practice.

In these drawings,—

Fig. 1 is a view mainly in elevation and partially in section showing a stoping drill provided with the illustrative form of my improved lubricating mechanism.

Fig. 2 is a central vertical section through my improved lubricating mechanism per se.

Fig. 3 is a transverse section on the line 3—3 of Fig. 2.

For purposes of illustration I have shown my improved lubricating mechanism used in connection with a stoping rock drill, which drill comprises a motor 1 adapted to operate a drill steel 2 and means 3 for feeding the motor toward the work. The motor is provided with a piston 4 reciprocable in a cylinder 5 and operating fluid is supplied to the motor under control of the throttle valve mechanism 6 through which compressed air is supplied by means of a line 7.

Connected between the throttle valve 6 and the line 7 is a casing 8 with one end of which the line 7 communicates and from a point near the opposite end of which a connection 9 leads off to the entrance of the throttle mechanism 6. A chamber 10 is formed within the casing 8 and connects the passages 7 and 9. Screwed longitudinally into an opening 11 at the opposite end of the casing 8 from the connection 7 is an inner casing 12 which has formed therein a chamber 13 constituting a lubricant reservoir, the lubricant being supplied to this reservoir by way of a port 14 closed by a screw plug 15. Extending longitudinally within the chamber 13 is a tubular projection 16 having a bore 17 opening at the bottom into the chamber 10 and at its top into the chamber 13 and longitudinally slidable in this bore and having a sliding fit therewith is a valve stem 18 having a conical valve 19 at its lower end which is adapted at times to seat upon a conical seat 20 at the lower end of the member 12. The stem 18 is traversed by a longitudinally extending passage 21 of small diameter, which passage opens by lateral ducts 22 and 23 through the sides of the stem 18, these ducts being so spaced that when the valve is unseated, the ducts communicate respectively with the chambers 10 and 13, while when the valve is seated the duct 22 is closed, although the duct 23 still communicates with the chamber 13. In a thickened portion of the member 12 there is formed a recess 24 in which a ball valve 25 is located, this valve cooperating with an upper conical seat 26 surrounding a port 27 opening into the interior of the casing 13 and the valve being maintained within the recess by a plug 28 threaded into the recess and traversed by a small passage 29. The length of the stem 18 between the valve 19 and its opposite end is such that when the plug 15 is screwed in place, the valve 19 is unseated, opening a connection between the chambers 10 and 13. To prevent the opening of the valve 19 so far as to close off the duct 23 I thread a small nut 30 on to the upper end of the stem 18 to limit the downward movement of the valve.

From the foregoing description the mode of operation of this device will be readily apparent. Assume that the mechanism is arranged as shown in Fig. 1 and that the lubricant reservoir is empty. By unscrewing the plug 15 and removing the same, it will be obvious that access may be had to the chamber 13 and it will further be noted that, with the removal of the plug 15, the unbalanced air pressure acting on the valve 19 will force it to its seat, and also that the valve 26 will be forced to its seat, whereby there will be no outrush of air to the port 14, irrespective of the fact that there is full line pressure in the connection 7 and chamber 10. When the plug 15 is screwed down in place after the filling of the reservoir 13, the stem 18 will be engaged thereby and the valve 19 will be forced open. Pressure will then flow from the chamber 10 through the port 22, passage 21, and port 23, into the reservoir 13 and, this pressure being transmitted through the relatively long and restricted passage 29, will follow the fluctuations in the pressure in the chamber 10 caused by the alternate beginning and interruption of flow controlled by the reciprocation of the piston 4 by a slight time interval, whereby the pressure variations in the chamber 10 and in the reservoir 13 will be slightly out of phase. The passage 29 being much shorter than the passage 21, will transmit the fluctuations in pressure in the chamber 10 to the recess 24 more rapidly, and so the fluctuations in the recess 24 will be out of phase with those in the reservoir 13 and as a result of this out-of-phase relationship of the pressure variations, there will be constant repetitions of periods when the pressure is less in the recess 24 than in the reservoir 13 immediately followed by periods when the pressure in the recess 24 is greater than that in the reservoir 13. As a result of these differences in pressure on opposite sides of the valve 25, the latter will be alternately seated and unseated and lubricant will flow on opening by the valve of the passage 27 into the recess 24, and on the next closure of the passage 27 by the valve, the pressure will flow down through the passage 29 into the chamber 10 and be carried over to the motor. It will be evident therefore that there is automatically provided a gradual feed of minute quantities of oil to the fluid pressure supply passing into the motor and accordingly the motor will be maintained adequately lubricated while no waste of oil will occur.

While I have in this application specifically described one form which my invention may assume in practice, it will be understood that this form of the same is shown for purposes of illustration and that the invention may be modified and embodied in various other forms without departing from its spirit or the scope of the appended claims.

What I claim as new and desire to secure by Letters Patent is:

1. A fluid pressure lubricating mechanism comprising a chambered outer casing having inlet and outlet fluid pressure openings, a lubricant reservoir positioned therein having communication with said chamber, and means for allowing communication with said reservoir from the outside and controlling said other communication.

2. A fluid pressure lubricating mechanism comprising a chambered outer casing having inlet and outlet fluid pressure openings, and a lubricant reservoir removably secured in said chamber adapted to have communication with the same.

3. In a pressure fluid lubricating mechanism adapted to be actuated by a fluctuating fluid pressure, a pressure chamber, a lubricant reservoir, and means to allow flow of said fluid either to or from said reservoir and adapted to intermittently feed said lubricant including a movable ported stem extending between said chamber and said reservoir.

4. In a pressure fluid lubricating mechanism adapted to be actuated by a fluctuating fluid pressure, a lubricant reservoir, means to allow flow of the fluid pressure either to or from said reservoir and adapted to permit an intermittent feed of lubricant from said reservoir, and means including a slidable ported member extending through said reservoir whereby said fluid pressure automatically stops the flow of lubricant when said reservoir is being filled.

5. In a lubricator, a casing having a pressure chamber formed therein, a detachable lubricant reservoir projecting within said chamber, a stem slidably arranged within said reservoir having an opening therethrough adapted to connect the chamber with said reservoir and constituting means for supplying pressure to act on the lubricant in said reservoir, and means for filling said reservoir including a removable closure element carried by said member, said closure element controlling the position of said stem.

6. In a lubricator, a variable pressure chamber, a lubricant reservoir removably secured to said chamber, a ported stem for supplying pressure fluid from said chamber to said reservoir, a valve seat formed on the lower surface of said reservoir, and a valve cooperating with said seat and secured to said stem for controlling the pressure fluid supply to said reservoir.

In testimony whereof I affix my signature.

ELMER G. GARTIN.